US011190244B1

(12) United States Patent
Tang et al.

(10) Patent No.: US 11,190,244 B1
(45) Date of Patent: Nov. 30, 2021

(54) LOW COMPLEXITY ALGORITHMS FOR PRECODING MATRIX CALCULATION

(71) Applicant: Samsung Electronics Co., Ltd., Suwon-si (KR)

(72) Inventors: Yanru Tang, San Diego, CA (US); Hongbing Cheng, San Diego, CA (US); Qi Zhan, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/031,655

(22) Filed: Sep. 24, 2020

Related U.S. Application Data

(60) Provisional application No. 63/059,699, filed on Jul. 31, 2020.

(51) Int. Cl.
*H04B 7/02* (2018.01)
*H04B 7/0456* (2017.01)

(52) U.S. Cl.
CPC .................................. *H04B 7/0456* (2013.01)

(58) Field of Classification Search
CPC .................................................... H04B 7/0456
USPC .......................................................... 375/267
See application file for complete search history.

(56) References Cited

U.S. PATENT DOCUMENTS 6,498,581 B1 12/2002 Yu
6,567,034 B1 5/2003 Yu
6,801,161 B2 10/2004 Lehtomaki et al.
7,443,925 B2 10/2008 Mehta et al.
7,881,247 B2 2/2011 Pan et al.
8,014,265 B2 9/2011 Sarkar et al.
9,148,205 B2 9/2015 Bhattad et al.
9,319,197 B2 4/2016 Sahin et al.
9,401,750 B2 7/2016 Sayana et al.
(Continued)

FOREIGN PATENT DOCUMENTS

WO WO 2020/082244 A1 4/2020

OTHER PUBLICATIONS

Martinian, E., "Waterfilling Gains O(1/SNR) at High SNR", Semantic Scholar, 2009, pp. 1-3.
(Continued)

*Primary Examiner* — Helene E Tayong
(74) *Attorney, Agent, or Firm* — Lewis Roca Rothgerber Christie LLP

(57) ABSTRACT

Low-complexity methods of calculating a precoding matrix for use in MIMO transmission. In some embodiments, a method of calculating a precoding matrix includes (i) calculating a first portion of a first singular value decomposition, based on a first portion of a channel matrix; (ii) calculating a second portion of a second singular value decomposition, based on a second portion of the channel matrix; (iii) calculating an intermediate matrix, based on: the first portion of the first singular value decomposition and the second portion of the second singular value decomposition; and (iv) calculating a matrix of approximate right singular vectors. The calculating of the matrix of approximate right singular vectors may include calculating a product of factors, the factors including a first factor based on the conjugate transpose of the intermediate matrix, a second factor based on a unitary matrix, and a third factor based on a diagonal matrix.

20 Claims, 10 Drawing Sheets

Input: $H = \begin{bmatrix} H_1 \\ H_2 \end{bmatrix}, H_1, H_2 \in \mathbb{C}^{N \times N_T}$ — 210

Calculate rank N SVDs of $H_1$ and $H_2$ — 215

Row permutation to generate $M = \begin{bmatrix} M_1 \\ M_2 \end{bmatrix} \in \mathbb{C}^{2N \times N_T}$ — 220

Calculate EDs of $M_1$ and $M_2$ — 225

Approximate SVD of $H$ — 230

(56) References Cited

U.S. PATENT DOCUMENTS

| | | | | |
|---|---|---|---|---|
| 9,893,777 | B2 | 2/2018 | Onggosanusi et al. | |
| 10,348,380 | B1 * | 7/2019 | Qi | H04L 25/0228 |
| 10,560,169 | B2 | 2/2020 | Yang et al. | |
| 10,651,905 | B1 | 5/2020 | Zhan et al. | |
| 2009/0285325 | A1 * | 11/2009 | Zhou | H04L 27/2608 375/267 |
| 2010/0111213 | A1 * | 5/2010 | Zhan | H04B 7/0413 375/267 |
| 2013/0287131 | A1 * | 10/2013 | Hart | H04B 7/0456 375/267 |
| 2015/0372733 | A1 * | 12/2015 | Kim | H04B 7/0404 375/267 |
| 2019/0109832 | A1 | 4/2019 | Shattil | |
| 2019/0207661 | A1 | 7/2019 | Olsson et al. | |
| 2019/0341976 | A1 | 11/2019 | Nam et al. | |

OTHER PUBLICATIONS

Mitra, R. et al., "Precoded Chebyshev-NLMS based pre-distorter for nonlinear LED compensation in NOMA-VLC", arXiv:1706.05309v1, Jun. 16, 2017, pp. 1-32.

Qiao, X. et al., "Eigen Decomposition-Based Hybrid Precoding for Millimeter Wave MIMO Systems With Low-Resolution ADCs/DACs", IEEE Xplore, Oct. 23, 2019, pp. 1-6.

Sikri, A. et al., "Precoding for Generalized Frequency Division Multiplexing with Linear Receivers", IEEEXplore, Octobers, 2017, 5 pages, IEEE.

Telatar, I. E., "Capacity of Multi-antenna Gaussian Channels", Sep. 12, 2008, pp. 1-28, http://web.mit.edu/18.325/www/telatar_capacity.pdf.

* cited by examiner

| **Input:** $H = \begin{bmatrix} H_1 \\ H_2 \end{bmatrix} \in \mathcal{C}^{2N \times N_T}$, $H_1, H_2 \in \mathcal{C}^{N \times N_T}$, $2N \leq N_T$, $N$ is even |
|---|
| **Step 1:** Calculate SVD of $H_1 \in \mathcal{C}^{N \times N_T}$ and $H_2 \in \mathcal{C}^{N \times N_T}$ as in (2-2) and (2-3)<br>**Step 2:** Generate matrices $\boldsymbol{M}_1$ and $\boldsymbol{M}_2$ as in (2-12) and calculate EDs of $\boldsymbol{M}_1 \boldsymbol{M}_1^H$ and $\boldsymbol{M}_2 \boldsymbol{M}_2^H$ as in (2-14) and (2-15).<br>**Step 3:** Estimate $\widehat{V}_H$ according to (2-21), where $U_{\tilde{M}}$ and $\Sigma_{\tilde{M}}$ are defined in (2-18) |
| **Output:** Estimated left singular vectors $\widehat{U}_H \in \mathcal{C}^{2N \times 2N}$, right singular vectors, $\widehat{V}_H \in \mathcal{C}^{N_T \times 2N}$ and singular values $\widehat{\Sigma}_H \in \mathcal{C}^{2N \times 2N}$ |

FIG. 2A

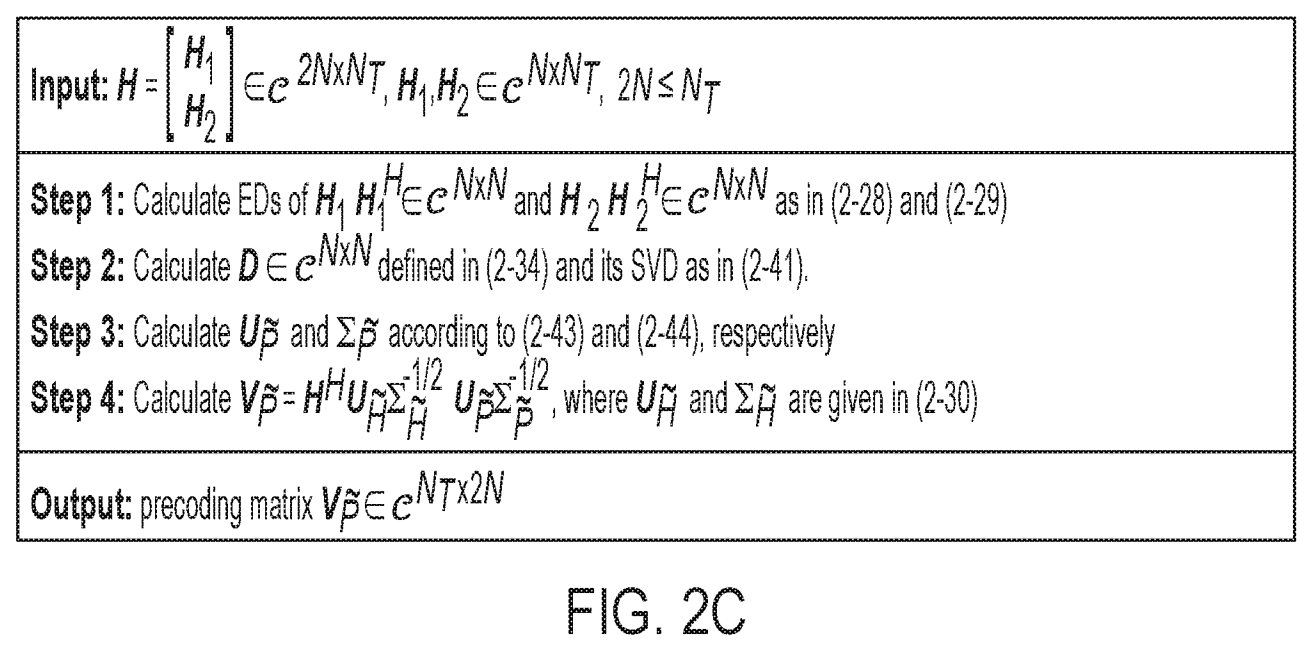

Input: $\boldsymbol{H} = \begin{bmatrix} \boldsymbol{H}_1 \\ \boldsymbol{H}_2 \end{bmatrix} \in \mathcal{C}^{2N \times N_T}$, $\boldsymbol{H}_1, \boldsymbol{H}_2 \in \mathcal{C}^{N \times N_T}$, $2N \leq N_T$

Step 1: Calculate EDs of $\boldsymbol{H}_1 \boldsymbol{H}_1^H \in \mathcal{C}^{N \times N}$ and $\boldsymbol{H}_2 \boldsymbol{H}_2^H \in \mathcal{C}^{N \times N}$ as in (2-28) and (2-29)

Step 2: Calculate $\boldsymbol{D} \in \mathcal{C}^{N \times N}$ defined in (2-34) and its SVD as in (2-41).

Step 3: Calculate $\boldsymbol{U}_{\tilde{P}}$ and $\Sigma_{\tilde{P}}$ according to (2-43) and (2-44), respectively

Step 4: Calculate $\boldsymbol{V}_{\tilde{P}} = \boldsymbol{H}^H \boldsymbol{U}_{\tilde{H}} \Sigma_{\tilde{H}}^{-1/2} \boldsymbol{U}_{\tilde{P}} \Sigma_{\tilde{P}}^{-1/2}$, where $\boldsymbol{U}_{\tilde{H}}$ and $\Sigma_{\tilde{H}}$ are given in (2-30)

Output: precoding matrix $\boldsymbol{V}_{\tilde{P}} \in \mathcal{C}^{N_T \times 2N}$

FIG. 2C

| | $N_T = 4$ | $N_T = 8$ | $N_T = 16$ | $N_T = 32$ |
|---|---|---|---|---|
| Transformed SVD | 291 | 395 | 603 | 1019 |
| SVD approximation | 344 | 504 | 824 | 1464 |

FIG. 3A

| | Num. of iteration = 4 | Num. of iteration = 6 | Num. of iteration = 10 |
|---|---|---|---|
| $N_T = 4$ | 984 | 1376 | 2160 |
| $N_T = 8$ | 1112 | 1504 | 2288 |
| $N_T = 16$ | 1368 | 1760 | 2544 |
| $N_T = 32$ | 1880 | 2272 | 3056 |

FIG. 3B

LOW COMPLEXITY ALGORITHMS FOR PRECODING MATRIX CALCULATION

CROSS-REFERENCE TO RELATED APPLICATION(S)

The present application claims priority to and the benefit of U.S. Provisional Application No. 63/059,699, filed Jul. 31, 2020, entitled "Low Complexity Algorithms for Precoding Matrix Calculation", the entire content of which is incorporated herein by reference.

FIELD

One or more aspects of embodiments according to the present disclosure relate to multiple-input and multiple-output (MIMO) transmission, and more particularly to low-complexity methods of calculating a precoding matrix for use in MIMO transmission.

BACKGROUND

Precoding may be used for transmission in MIMO systems, to achieve good channel capacity performance. Precoding may employ a precoding matrix, which may be calculated from a channel matrix, using a calculation that may be costly, as measured, for example, by the number of complex multiplications it requires.

Thus, there is a need for low-complexity methods of calculating a precoding matrix for use in MIMO transmission.

SUMMARY

According to an embodiment of the present invention, there is provided a method, including: calculating a first portion of a first singular value decomposition, based on a first portion of a channel matrix; calculating a second portion of a second singular value decomposition, based on a second portion of the channel matrix; calculating an intermediate matrix, based on: the first portion of the first singular value decomposition and the second portion of the second singular value decomposition; and calculating a matrix of approximate right singular vectors, the calculating of the matrix of approximate right singular vectors including calculating a product of factors, the factors including a first factor based on the conjugate transpose of the intermediate matrix, a second factor based on a unitary matrix, and a third factor based on a diagonal matrix.

In some embodiments, the calculating of the intermediate matrix includes calculating a row permutation of a matrix, the matrix including: the first portion of the first singular value decomposition, and the second portion of the second singular value decomposition.

In some embodiments: the first portion of the first singular value decomposition includes a first singular value matrix and a first right singular vector matrix; the second portion of the first singular value decomposition includes a second singular value matrix and a second right singular vector matrix; the intermediate matrix includes a first portion and a second portion; the first portion of the intermediate matrix includes: a product of a first portion of the first singular value matrix and a first portion of the first right singular vector matrix, and a product of a first portion of the second singular value matrix and a first portion of the second right singular vector matrix; and the second portion of the intermediate matrix includes: a product of a second portion of the first singular value matrix and a second portion of the first right singular vector matrix, and a product of a second portion of second first singular value matrix and a second portion of the second right singular vector matrix.

In some embodiments, the method further includes: calculating a first eigen decomposition, the first eigen decomposition being an eigen decomposition of the conjugate product of a first portion of the intermediate matrix; and calculating a second eigen decomposition, the second eigen decomposition being an eigen decomposition of the product of a second portion of the intermediate matrix and the conjugate transpose of the second portion of the intermediate matrix.

In some embodiments, the unitary matrix is based on: the left eigenvector matrix of the first eigen decomposition, and the left eigenvector matrix of the second eigen decomposition.

In some embodiments, the diagonal matrix is based on: the eigenvalues of the first eigen decomposition, and the eigenvalues of the second eigen decomposition.

In some embodiments, the method further includes multiplying a transmitted signal by a precoding matrix, wherein the precoding matrix includes a right singular vector of the matrix of approximate right singular vectors.

According to an embodiment of the present invention, there is provided a method, including: calculating a first eigen decomposition, based on a first portion of a channel matrix; calculating a second eigen decomposition, based on a second portion of the channel matrix; calculating a transformation matrix, based on: the left eigenvector matrix of the first eigen decomposition, the left eigenvector matrix of the second eigen decomposition, the eigenvalues of the first eigen decomposition, and the eigenvalues of the second eigen decomposition; calculating an eigen decomposition of an intermediate matrix, the intermediate matrix being based on: the transformation matrix, and the channel matrix; and calculating a right singular matrix of transformed channel, the calculating of the right singular matrix of transformed channel including calculating a product of factors, the factors including a first factor based on the conjugate transpose of the intermediate matrix, a second factor based on a unitary matrix, and a third factor based on a diagonal matrix.

In some embodiments, the calculating of the transformation matrix includes calculating the product of a fourth factor and a fifth factor, wherein: the fourth factor is a block diagonal matrix including: the left eigenvector matrix of the first eigen decomposition, and the left eigenvector matrix of the second eigen decomposition; and the fifth factor is a diagonal matrix including: the eigenvalue matrix of the first eigen decomposition, and the eigenvalue matrix of the second eigen decomposition.

In some embodiments, the method further includes calculating the unitary matrix, the calculating of the unitary matrix including calculating a singular value decomposition of an off-diagonal block of the conjugate product of the intermediate matrix, to form a first left singular vector matrix and a singular value matrix.

In some embodiments, the method further includes calculating the unitary matrix, wherein a first block of the unitary matrix is the first left singular matrix; and a second block of the unitary matrix is the product of: the conjugate transpose of the off-diagonal block of the conjugate product of the intermediate matrix, the first left singular matrix, and the inverse of the singular value matrix.

In some embodiments: the first factor is the conjugate transpose of the intermediate matrix, the second factor is the left eigenvector matrix of the eigen decomposition of the conjugate product of the intermediate matrix, and the diagonal matrix is the square root of the eigenvalue matrix of the eigen decomposition of the conjugate product of the intermediate matrix.

In some embodiments, the method further includes multiplying a transmitted signal by a precoding matrix, wherein the precoding matrix is the right singular matrix of transformed channel.

According to an embodiment of the present invention, there is provided a system including: a processing circuit; a transmitter; and a plurality of antennas, the processing circuit being configured to: calculate a first portion of a first singular value decomposition, based on a first portion of a channel matrix; calculate a second portion of a second singular value decomposition, based on a second portion of the channel matrix; calculate an intermediate matrix, based on: the first portion of the first singular value decomposition and the second portion of the second singular value decomposition; and calculate a matrix of approximate right singular vectors, the calculating of the matrix of approximate right singular vectors including calculating a product of factors, the factors including first factor based on the conjugate transpose of the intermediate matrix, a second factor based on a unitary matrix, and a third factor based on a diagonal matrix.

In some embodiments, the calculating of the intermediate matrix includes calculating a row permutation of a matrix, the matrix including: the first portion of the first singular value decomposition, and the second portion of the second singular value decomposition.

In some embodiments: the first portion of the first singular value decomposition includes a first singular value matrix and a first right singular vector matrix; the second portion of the first singular value decomposition includes a second singular value matrix and a second right singular vector matrix; the intermediate matrix includes a first portion and a second portion; the first portion of the intermediate matrix includes: a product of a first portion of the first singular value matrix and a first portion of the first right singular vector matrix, and a product of a first portion of the second singular value matrix and a first portion of the second right singular vector matrix; and the second portion of the intermediate matrix includes: a product of a second portion of the first singular value matrix and a second portion of the first right singular vector matrix, and a product of a second portion of second first singular value matrix and a second portion of the second right singular vector matrix.

In some embodiments, the processing circuit is further configured to: calculate a first eigen decomposition, the first eigen decomposition being an eigen decomposition of the conjugate product of a first portion of the intermediate matrix; and calculate a second eigen decomposition, the second eigen decomposition being an eigen decomposition of the product of a second portion of the intermediate matrix and the conjugate transpose of the second portion of the intermediate matrix.

In some embodiments, the unitary matrix is based on: the left eigenvector matrix of the first eigen decomposition, and the left eigenvector matrix of the second eigen decomposition.

In some embodiments, the diagonal matrix is based on: the eigenvalues of the first eigen decomposition, and the eigenvalues of the second eigen decomposition.

In some embodiments, the processing circuit is further configured to multiply a transmitted signal by a precoding matrix, wherein the precoding matrix includes a right singular vector of the matrix of approximate right singular vectors.

BRIEF DESCRIPTION OF THE DRAWINGS

These and other features and advantages of the present disclosure will be appreciated and understood with reference to the specification, claims, and appended drawings wherein:

FIG. 2A is a table illustrating steps in a low-complexity method of calculating a precoding matrix for use in MIMO transmission, according to an embodiment of the present disclosure;

FIG. 2C is a table illustrating steps in a low-complexity method of calculating a precoding matrix for use in MIMO transmission, according to an embodiment of the present disclosure;

FIG. 3A is a table of computational cost, according to an embodiment of the present disclosure;

FIG. 3B is a table of computational cost, according to a related art method;

DETAILED DESCRIPTION

The detailed description set forth below in connection with the appended drawings is intended as a description of exemplary embodiments of low-complexity methods of calculating a precoding matrix for use in MIMO transmission provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
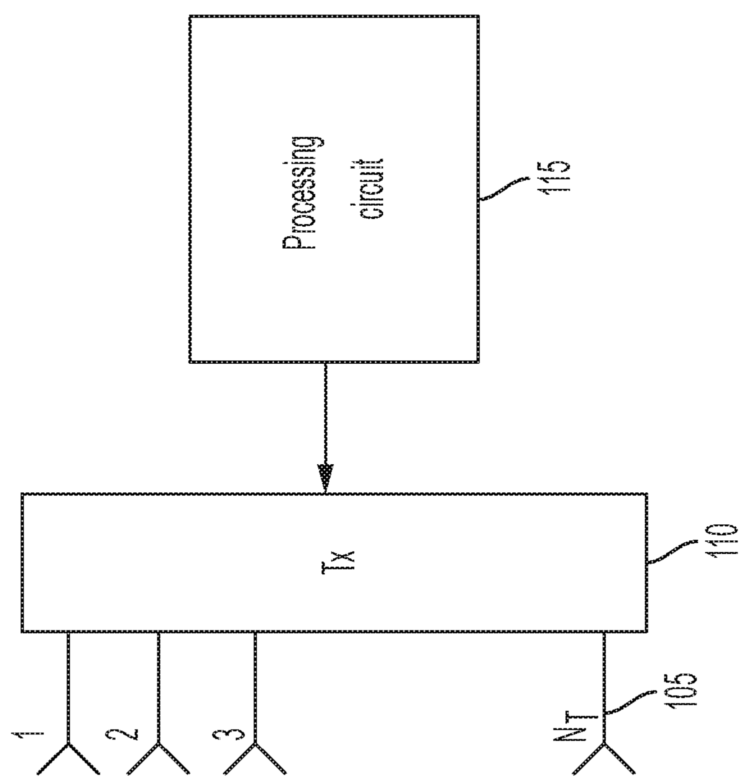
FIG. 1 is a block diagram of a MIMO system, according to an embodiment of the present disclosure.

FIG. 1 shows a MIMO transmitting system, in some embodiments. The system includes a plurality of antennas 105, a transmitter 110 (e.g., a circuit including digital to analog converters, amplifiers, modulators, and the like, for generating analog antenna drive signals), and a processing circuit 115 for providing digital signals to the transmitter. In the processing circuit, a transmitted signal may be multiplied by a precoding matrix. The calculation of the decoding matrix may involve calculating a singular value decomposition of the channel matrix, and using the resulting matrix of right singular vectors as the precoding matrix. In some embodiments, the complexity (i.e., the cost) of this calculation may be reduced.

A first embodiment may be referred to as a singular value decomposition (SVD) approximation, which may estimate the SVD of the channel matrix H using four rank N SVDs, where $H \in \mathbb{C}^{2N \times N_T}$ has full row rank and $N_T \geq 2N$ (with N even), N is the total number of rows of the channel matrix H, and $N_T$ is the number of columns (which is equal to the number of antennas 105). In some embodiments, an all-zero row may be added to the channel matrix, if N is odd.

The channel matrix H may be written as including (e.g., consisting of) a first portion and a second portion, the first portion being, e.g., an upper submatrix $H_1$ including half of the elements of the channel matrix H, and the second portion being, e.g., a lower submatrix $H_2$ including the other half of the elements of the channel matrix H:

$$H = \begin{bmatrix} H_1 \\ H_2 \end{bmatrix} H_1, H_2 \in C^{N \times N_T} \tag{2-1}$$

Two rank N SVDs of $H_1$ and $H_2$ may be calculated, denoted by $$H_1 = U_1 \Lambda_1 V_1^H \tag{2-2}$$

$$H_2 = U_1 \Lambda_2 V_2^H \tag{2-3}$$

where $U_1, U_2 \in \mathbb{C}^{N \times N}$ and $$\Lambda_i = \mathrm{diag}([\sigma_{i1}, \ldots, \sigma_{iN}]) \in \mathbb{C}^{N \times N}, i=1,2 \tag{2-4}$$

$$V_i = [v_{i1}, \ldots, v_{iN}] \in \mathbb{C}^{N_T \times N}, i=1,2 \tag{2-5}$$

Each of $U_1$, $U_2$ may be referred to as a “left singular vector matrix”. Given (2-2) and (2-3), H can be written as $$H = \begin{bmatrix} U_1 & 0_N \\ 0_N & U_2 \end{bmatrix} \begin{bmatrix} \Lambda_1 V_1^H \\ \Lambda_2 V_2^H \end{bmatrix} \tag{2-6}$$

A permutation matrix R may be defined as follows.

$$R = \begin{bmatrix} I_{N/2} & 0_{N/2} & 0_{N/2} & 0_{N/2} \\ 0_{N/2} & 0_{N/2} & I_{N/2} & 0_{N/2} \\ 0_{N/2} & I_{N/2} & 0_{N/2} & 0_{N/2} \\ 0_{N/2} & 0_{N/2} & 0_{N/2} & I_{N/2} \end{bmatrix} \in C^{2N \times 2N} \tag{2-7}$$

where $I_{N/2}$ and $O_{N/2}$ denote identity and all zero matrices of size $$\frac{N}{2} \times \frac{N}{2},$$

respectively. Given that $RR = I_{2N}$, (2-6) can be written as $$H = \begin{bmatrix} U_1 & 0 \\ 0 & U_2 \end{bmatrix} RM \tag{2-8}$$

where the intermediate matrix M is $$M = R \begin{bmatrix} \Lambda_1 V_1^H \\ \Lambda_2 V_2^H \end{bmatrix} = \begin{bmatrix} M_1 \\ M_2 \end{bmatrix} \in C^{2N \times N_T} \tag{2-9}$$

The intermediate matrix M may be calculated, as shown above, as a row permutation of a matrix including a first portion $\Lambda_1 V_1^H$ of the first singular value decomposition (the first portion of the first singular value decomposition including a first singular value matrix $\Lambda_1$ and a first right singular vector matrix $V_1^H$) and a second portion $\Lambda_2 V_2^H$ of the second singular value decomposition (the second portion of the second singular value decomposition including a second singular value matrix $\Lambda_2$ and a second right singular vector matrix $V_2^H$). The intermediate matrix M may include a first portion as an upper submatrix $M_1$ and a second portion as a lower submatrix $M_2$, as shown.

The matrices $\Lambda_i$ and $V_i$ may be written as:

$$\Lambda_i = \begin{bmatrix} \Lambda_{i1} & 0_{N/2} \\ 0_{N/2} & \Lambda_{i2} \end{bmatrix}, \Lambda_{i1}, \Lambda_{i2} \in C^{\frac{N}{2} \times \frac{N}{2}}, i = 1, 2 \tag{2-10}$$

$$V_i = [V_{i1}\ V_{i2}], V_{i1}, V_{i2} \in C^{N_T \times \frac{N}{2}}, i = 1, 2. \tag{2-11}$$

Then $$M_1 = \begin{bmatrix} \Lambda_{11} V_{11}^H \\ \Lambda_{21} V_{21}^H \end{bmatrix} \in C^{N \times N_T}, M_2 = \begin{bmatrix} \Lambda_{12} V_{12}^H \\ \Lambda_{22} V_{22}^H \end{bmatrix} \in C^{N \times N_T} \tag{2-12}$$

As a result of the permutation, the first portion $M_1$ of the intermediate matrix includes, for example, a product $\Lambda_{11} V_{11}^H$ of a first portion of the first singular value matrix and a first portion of the first right singular vector matrix, and a product $\Lambda_{21} V_{21}^H$ of a first portion of the second singular value matrix and a first portion of the second right singular vector matrix. In Equation (2-8), $$\begin{bmatrix} U_1 & 0 \\ 0 & U_2 \end{bmatrix} R$$

is unitary. To calculate right singular vectors of H, it is sufficient to calculate right singular vectors of $M \in \mathbb{C}^{2N \times N_T}$.

The SVD of M may be approximated with two rank N SVDs. Defining $$A = \begin{bmatrix} M_1 \\ 0_{N \times N_T} \end{bmatrix} \in C^{2N \times N_T}, B = \begin{bmatrix} 0_{N \times N_T} \\ M_2 \end{bmatrix} \in C^{2N \times N_T} \tag{2-13}$$

two rank N eigen decompositions (EDs), of $M_1 M_1^H$ and $M_2 M_2^H$, may be calculated, as $$M_1 M_1^H = U_{M_1} \Sigma_{M_1} U_{M_1}^H \in \mathbb{C}^{N \times N} \tag{2-14}$$

$$M_2 M_2^H = U_{M_2} \Sigma_{M_2} U_{M_2}^H \in \mathbb{C}^{N \times N} \tag{2-15}$$

The calculation of the eigen decomposition of $M_1 M_1^H$, the product of $M_1$ with the conjugate transpose of $M_1$ (which may be referred to herein as the “conjugate product” of $M_1$) may include, as shown above, calculating an eigen decomposition, the eigen decomposition being an eigen decomposition of the conjugate product of the first portion $M_1$ of the intermediate matrix M. The left unitary matrix of an eigen decomposition (e.g., $U_{M_1}$) may be referred to herein as a “left eigenvector matrix” of the eigen decomposition.

An approximate intermediate matrix M may then be defined such that $$\tilde{M}\tilde{M}^H = AA^H + BB^H = \begin{bmatrix} M_1M_1^H & 0_N \\ 0_N & M_2M_2^H \end{bmatrix} \tag{2-16}$$

Given (2-14) and (2-15), the eigen decomposition of $\tilde{M}\tilde{M}^H$ is given by $$\tilde{M}\tilde{M}^H = U_{\tilde{M}}\Sigma_{\tilde{M}}U_{\tilde{M}}^H \tag{2-17}$$

where $$U_{\tilde{M}} = \begin{bmatrix} U_{M_1} & 0_N \\ 0_N & U_{M_2} \end{bmatrix} \in C^{2N\times 2N}, \sum_{\tilde{M}} = \begin{bmatrix} \sum_{M_1} & 0_N \\ 0_N & \sum_{M_2} \end{bmatrix} \in C^{2N\times 2N} \tag{2-18}$$

An approximate eigen decomposition of the product $MM^H$ (i.e., of the conjugate product of the intermediate matrix M) may then be calculated. The conjugate product of M, i.e., $MM^H$, may also be written $$MM^H = \tilde{M}\tilde{M}^H + \begin{bmatrix} 0_N & M_1M_2^H \\ M_2M_1^H & 0_N \end{bmatrix} \tag{2-19}$$

with $$M_1M_2^H = \begin{bmatrix} 0_{N/2} & \Lambda_{11}V_{11}^HV_{22}\Lambda_{22}^H \\ \Lambda_{21}V_{21}^HV_{12}\Lambda_{12}^H & 0_{N/2} \end{bmatrix} \in C^{N\times N} \tag{2-20}$$

where $$\Lambda_{ij} \in C^{\frac{N}{2}\times\frac{N}{2}}, V_{ij} \in C^{N_T\times\frac{N}{2}}$$

are defined in (2-10) and (2-11), respectively. The cross-term $M_1M_2^H$ may be sufficiently small to be neglected, for example, when H has orthogonal rows, and, in this case, $MM^H$ may be approximated by $\tilde{M}\tilde{M}^H$ and the left singular vector of M may be calculated as $U_{\tilde{M}}$. Therefore, the approximate right singular vector matrix $\hat{V}_H$ of M may be calculated as $$\hat{V}_H = M^H U_{\tilde{M}} \sum_{\tilde{M}}^{-1/2} \in C^{N_T\times 2N} \tag{2-21}$$

The SVD of $H \in \mathcal{C}^{2N\times N_T}$ may then be approximated by $$H \approx \begin{bmatrix} U_1 & 0 \\ 0 & U_2 \end{bmatrix} RU_{\tilde{M}} \sum_{\tilde{M}} \hat{V}_H \tag{2-22}$$

In summary:

1.

$$\hat{U}_H = \begin{bmatrix} U_1 & 0 \\ 0 & U_2 \end{bmatrix} RU_{\tilde{M}}$$

is an estimate of left singular vectors of H

2.

$$\hat{\sum_H} = \sum_{\tilde{M}}$$

is an estimate of singular values of H

3. $\hat{V}_H$ is an estimate of right singular vectors of H.

Figure 2B:
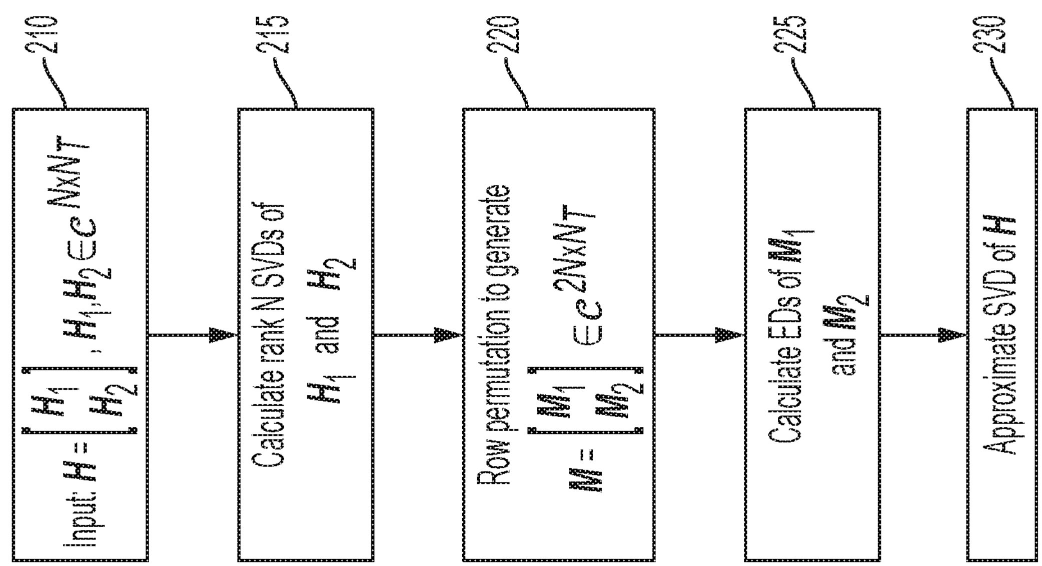
FIG. 2B is a flow chart of a low-complexity method of calculating a precoding matrix for use in MIMO transmission, according to an embodiment of the present disclosure.

A method using SVD approximation may be performed according to the table of FIG. 2A, and according to the flow chart of FIG. 2B. In FIG. 2B, the input, at 210, is a channel matrix; at 215, two rank N SVDs are calculated; at 220, a row permutation is performed, to produce the intermediate matrix M; at 225, two eigen decompositions are calculated; and, at 230, an approximate SVD of the channel matrix is calculated.

The estimated right singular vectors in $\hat{V}_H$ may not be mutually orthogonal because the eigenvectors of $MM^H \in \mathcal{C}^{2N\times 2N}$ are approximated by $U_{\tilde{M}}$ and $MM^H \neq \tilde{M}\tilde{M}^H$ according to (2-19). However, each estimated vector in $\hat{V}_H$ may have a magnitude of 1. The order of right singular vectors in $V_1$ and $V_2$ will affect the cross term $M_1M_2^H$ and thus it will affect the accuracy of the approximation. As such, the singular vector may be ordered appropriately to improve the performance of the algorithm.

A second embodiment may be referred to as a transformed SVD method. This embodiment may be employed to derive a precoding matrix $\tilde{V} \in \mathcal{C}^{N_T\times 2N}$ satisfying (2-24) (which may be referred to as a "right singular matrix of transformed channel") that results in the same capacity as may be achieved using the precoding matrix $V_H$. Given $\tilde{V}$, the corresponding capacity $C(\tilde{V})$ is calculated as $$C(\tilde{V}) = \log(|I_{2N} + \rho H\tilde{V}\tilde{V}^H H^H|) \tag{2-23}$$

where ρ denotes the SNR. It may be seen that $C(\tilde{V}) = C(V_H)$ if $$\tilde{V} = V_H T \text{ for some unitary } T \in \mathcal{C}^{2N\times 2N} \tag{2-24}$$

where $V_H$ is a matrix of actual eigenvectors (i.e., eigenvectors determined or defined without the use of approximations) of $H^HH$. The transformed SVD may be designed to derive $\tilde{V}$ to satisfy (2-24) with reasonably low complexity.

The following theorem may be shown to hold and may form the basis for such a calculation: Given $H \in \mathcal{C}^{2N\times N_T}$ and given $\tilde{P} = Q^HH$ for any full rank matrix $Q \in \mathcal{C}^{2N\times 2N}$, having a singular value decomposition $\tilde{P} = U_{\tilde{P}}\Lambda_{\tilde{P}}V_{\tilde{P}}^H$, then $V_{\tilde{P}} = V_HT$ for some unitary matrix T. The matrix Q may be referred to as a "transformation matrix".

The theorem may be proved as follows.

$$\tilde{P} = Q^HH = Q^HU_H\Sigma_HV_H^H \tag{2-25}$$

The SVD of $\tilde{P}$ can be derived based on that of $Q^HU_H\Sigma_H \in \mathcal{C}^{2N\times 2N}$. Denoting the SVD of $\tilde{Q} = Q^HU_H\Sigma_H$ as $$\tilde{Q} = U_{\tilde{Q}}\Sigma_{\tilde{Q}}V_{\tilde{Q}}^H \tag{2-26}$$

it follows that $$V_{\tilde{P}} = V_HV_{\tilde{Q}} \tag{2-27}$$

where $V_{\tilde{Q}}$ is a matrix of right singular vectors of $\tilde{Q}$ and is unitary.

The theorem above implies that, to derive a precoder $\tilde{V}=V_H T$ for some unitary matrix T, it is sufficient to derive the right singular vectors $V_{\tilde{P}}$ of $\tilde{P}$. However, if Q is not chosen carefully, the complexity of calculating $V_{\tilde{P}}$ may be the same as that of calculating $V_H$. To reduce the complexity, Q may be chosen as follows. For a given $H \in \mathcal{C}^{2N \times N_T}$, where $N_T \geq 2N$, with H having full row rank, $H_1, H_2 \in \mathcal{C}^{N \times N_T}$ may be defined as in (2-1). Two rank N eigen decompositions, of $H_1 H_1^H \in C^{N \times N}$ and $H_2 H_2^H \in \mathcal{C}^{N \times N}$ may be calculated, given by $$H_1 H_1^H = U_1 \Sigma_1 U_1^H \tag{2-28}$$

$$H_2 H_2^H = U_2 \Sigma_2 U_2^H \tag{2-29}$$

where $U_1, U_2 \in \mathcal{C}^{N \times N}$ and $\Sigma_i = \mathrm{diag}([\lambda_{i1}, \ldots, \lambda_{iN}]) \in \mathcal{C}^{N \times N}$, i=1, 2. Defining $$U_{\tilde{H}} = \begin{bmatrix} U_1 & 0_N \\ 0_N & U_2 \end{bmatrix} \in C^{2N \times 2N}, \ \sum_{\tilde{H}} = \begin{bmatrix} \sum_1 & 0_N \\ 0_N & \sum_2 \end{bmatrix} \in C^{2N \times 2N} \tag{2-30}$$

the matrix Q may be chosen according to $$Q = U_{\tilde{H}} \sum_{\tilde{H}}^{-1/2} \in C^{2N \times 2N} \tag{2-31}$$

An intermediate matrix $\tilde{P}$ may then be defined as follows:

$$\tilde{P} = \sum_{\tilde{H}}^{-1/2} U_{\tilde{H}}^H H \in C^{2N \times N_T} \tag{2-32}$$

The SVD of $\tilde{P}$ may then be derived using a rank N SVD. The conjugate product of $\tilde{P}$ has, because of the above-described choice of Q, the following form:

$$\tilde{P}\tilde{P}^H = \begin{bmatrix} I_N & D \\ D^H & I_N \end{bmatrix} \in C^{2N \times 2N} \tag{2-33}$$

where $$D = \sum_1^{-1/2} U_1^H H_1 H_2^H U_2 \sum_2^{-1/2} \in C^{N \times N} \tag{2-34}$$

The matrix D may be referred to as an "off-diagonal block" of the matrix $\tilde{P}\tilde{P}^H$. The true eigen decomposition of $\tilde{P}\tilde{P}^H$ may be derived based on that of $DD^H \in \mathcal{C}^{N \times N}$. Denoting $$\begin{bmatrix} x_1 \\ x_2 \end{bmatrix} \in C^{2N},$$

where $x_1, x_2 \in \mathcal{C}^N$, as an eigenvector of $\tilde{P}\tilde{P}^H$ corresponding to eigenvalue of A, it follows that $$\begin{bmatrix} I_N & D \\ D^H & I_N \end{bmatrix} \begin{bmatrix} x_1 \\ x_2 \end{bmatrix} = \lambda \begin{bmatrix} x_1 \\ x_2 \end{bmatrix} \tag{2-35}$$

From (2-35), the following two equations, (2-36) and (2-37), may be derived:

$$x_1 + Dx_2 = \lambda x_1 \tag{2-36}$$

$$D^H x_1 + x_2 = \lambda x_2 \tag{2-37}$$

From (2-37), it follows that $$x_2 = \frac{1}{\lambda - 1} D^H x_1 \tag{2-38}$$

Substituting (2-37) back into (2-36) results in the following:

$$DD^H x_1 = (\lambda - 1)^2 x_1 \tag{2-39}$$

Equation (2-39) implies that if $\sigma_D$ is a singular value of D and $u_D$ is an eigenvector of $DD^H$, $1+\sigma_D$ and $1-\sigma_D$ must be eigenvalues of $\tilde{P}\tilde{P}^H$, with the corresponding eigenvectors being denoted by $$\begin{bmatrix} u_D \\ \frac{1}{\sigma_D} D^H u_D \end{bmatrix} \text{ and } \begin{bmatrix} u_D \\ \frac{-1}{\sigma_D} D^H u_D \end{bmatrix} \tag{2-40}$$

Denoting the SVD of $D \in \mathcal{C}^{N \times N}$ as $$D = U_D \Lambda_D V_D^H \tag{2-41}$$

the eigen decomposition of $\tilde{P}\tilde{P}^H$ can be represented as $$\tilde{P}\tilde{P}^H = U_{\tilde{P}} \Sigma_{\tilde{P}} U_{\tilde{P}}^H \tag{2-42}$$

where $$U_{\tilde{P}} = \frac{1}{\sqrt{2}} \begin{bmatrix} U_D & U_D \\ D^H U_D \Lambda_D^{-1} & -D^H U_D \Lambda_D^{-1} \end{bmatrix} \in C^{2N \times 2N} \tag{2-43}$$

and $$\sum_{\tilde{P}} = \begin{bmatrix} 1 + \Lambda_D & 0_N \\ 0_N & 1 - \Lambda_D \end{bmatrix} \in C^{2N \times 2N} \tag{2-44}$$

In Equation (2-43), a first block of the unitary matrix $U_{\tilde{P}}$ is the first left singular matrix $U_D$, and a second block $D^H U_D \Lambda_D^{-1}$ of the unitary matrix is the product of (i) the conjugate transpose $D^H$ of the off-diagonal block of the conjugate product of the intermediate matrix, (ii) the left singular matrix $U_D$, and (iii) the inverse $\Lambda_D^{-1}$ of the singular value matrix. Given $U_{\tilde{P}}$ and $\Sigma_{\tilde{P}}$, the right singular vector matrix of $\tilde{P}$ is calculated as $$V_{\tilde{P}} = \tilde{P}^H U_{\tilde{P}} \sum_{\tilde{P}}^{-1/2} \in C^{N_T \times 2N} \tag{2-45}$$

and, according to the theorem above, $V_{\tilde{P}} = V_H T$.

Figure 2D:
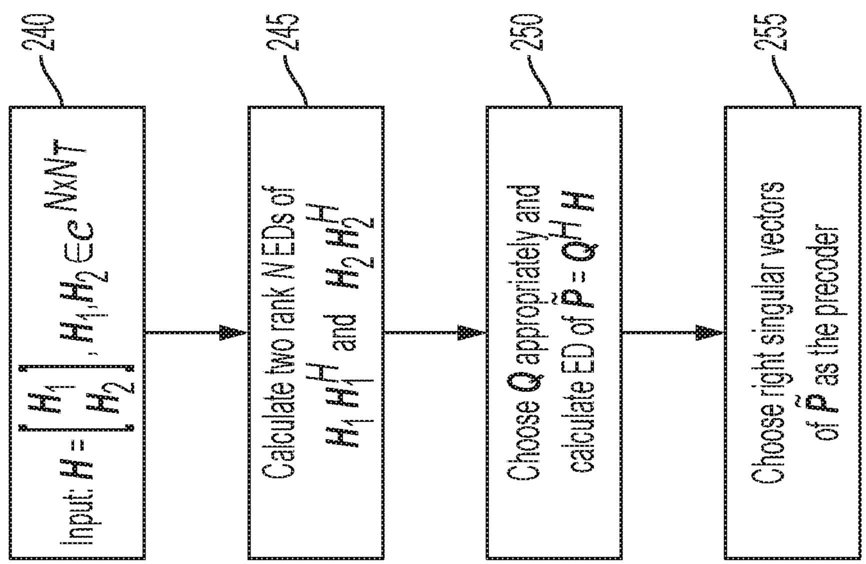
FIG. 2D is a flow chart of a low-complexity method of calculating a precoding matrix for use in MIMO transmission, according to an embodiment of the present disclosure.

The transformed SVD method may be performed according to the table of FIG. 2C, or according to the flow chart of FIG. 2D. In FIG. 2D, the input, at 240, is a channel matrix; at 245, two rank N SVDs are calculated; at 250, a transformation matrix is chosen, and an intermediate matrix is calculated; and, at 255, the right singular vectors of the intermediate vectors are used as corresponding right singular vectors for precoding.

In the method employing SVD approximation, four rank N SVDs are calculated. When N is large, it may be possible to further reduce the complexity, by approximating each rank N SVD by rank N/2 SVDs using the low complexity SVD approximation and so on until the desired complexity requirement is met. However, the accuracy of the estimation may suffer due to the approximation at each level.

In the transformed SVD method, three rank N SVDs are calculated, viz. SVDs of $H_1H_1 \in \mathcal{C}^{N\times N}$, $H_2H_2^H \in \mathcal{C}^{N\times N}$ and $D \in \mathcal{C}^{N\times N}$. When N>2 and N is even, the complexity can be further reduced to a calculation of one rank N SVD plus six rank N/2 SVDs.

The actual SVD of $H_1$ and $H_2$ may be denoted as in (2-2) and (2-3). $\tilde{P}$ in (2-25) is equivalent to $$\tilde{P}^H=[V_1V_2] \in \mathcal{C}^{N_T\times 2N} \tag{2-46}$$

where $V_1 \in \mathcal{C}^{N_T\times N}$ and $V_2 \in \mathcal{C}^{N_T\times N}$ are matrices of the actual N eigenvectors of $H_1^HH_1$ and $H_2^HH_2$, respectively.

If N is even, then, denoting $\tilde{V}_1 \in \mathcal{C}^{N_T\times N}$ and $\tilde{V}_2 \in \mathcal{C}^{N_T\times N}$ as derived precoding matrices for $H_1$ and $H_2$ using low complexity transformed SVD, it follows that $$\tilde{V}_1=V_1T_1 \tag{2-47}$$

$$\tilde{V}_2=V_2T_2 \tag{2-48}$$

for some unitary matrix $T_1, T_2 \in \mathcal{C}^{N\times N}$. Replacing $V_1$ by $\tilde{V}_1$ and $V_2$ by $\tilde{V}_2$, the matrix $\check{P}$ is defined:

$$\check{P}^H = [\tilde{V}_1\ \tilde{V}_2] = \tilde{P}^H\begin{bmatrix} T_1 & 0_N \\ 0_N & T_2 \end{bmatrix} \in C^{N_T\times 2N} \tag{2-49}$$

It may be seen that the SVD of $\check{P}\check{P}^H \in \mathcal{C}^{2N\times 2N}$ can be derived based on the actual SVD of $\check{D}$, where $$\check{D}=\tilde{V}_1^H\tilde{V}_2 \in \mathcal{C}^{N\times N} \tag{2-50}$$

Therefore, there is no need to calculate the true eigen decomposition of $H_1^HH_1$ and $H_2^HH_2$. Instead, it is sufficient to apply the transformed SVD algorithm to $H_1$ and $H_2$ to derive the corresponding precoding matrix $\tilde{V}_1 \in \mathcal{C}^{N_T\times N}$ and $\tilde{V}_2 \in \mathcal{C}^{N_T\times N}$, and then calculate the right singular vectors $\check{P}$ based on the SVD of b. Note that the true SVD of b may be needed to guarantee to achieve the same capacity as true right singular vectors of the channel. This method only requires one rank N SVD of $\check{D}$ plus six rank N/2 SVDs to derive $\tilde{V}_1$ and $\tilde{V}_2$ and derives $\tilde{V}$ satisfying (2-24).

The complexity can be further reduced by calculating an approximate SVD of $\check{D}$ using the SVD approximation method. However, whenever the approximated SVD is not the same as the actual value, the derived precoding matrix may no longer satisfy (2-24) and, as such, it is possible that the same capacity performance may not be achieved.

The table of FIG. 3A shows the computational cost, measured by the number of complex multiplications required, of the embodiment using a transformed singular value decomposition, and (in the row below) of the embodiment using an approximate singular value decomposition. For comparison, the cost, measured by the number of complex multiplications required, of a direct calculation (by QR decomposition) of the channel matrix H is shown in the table of FIG. 3B.

Figure 4A:
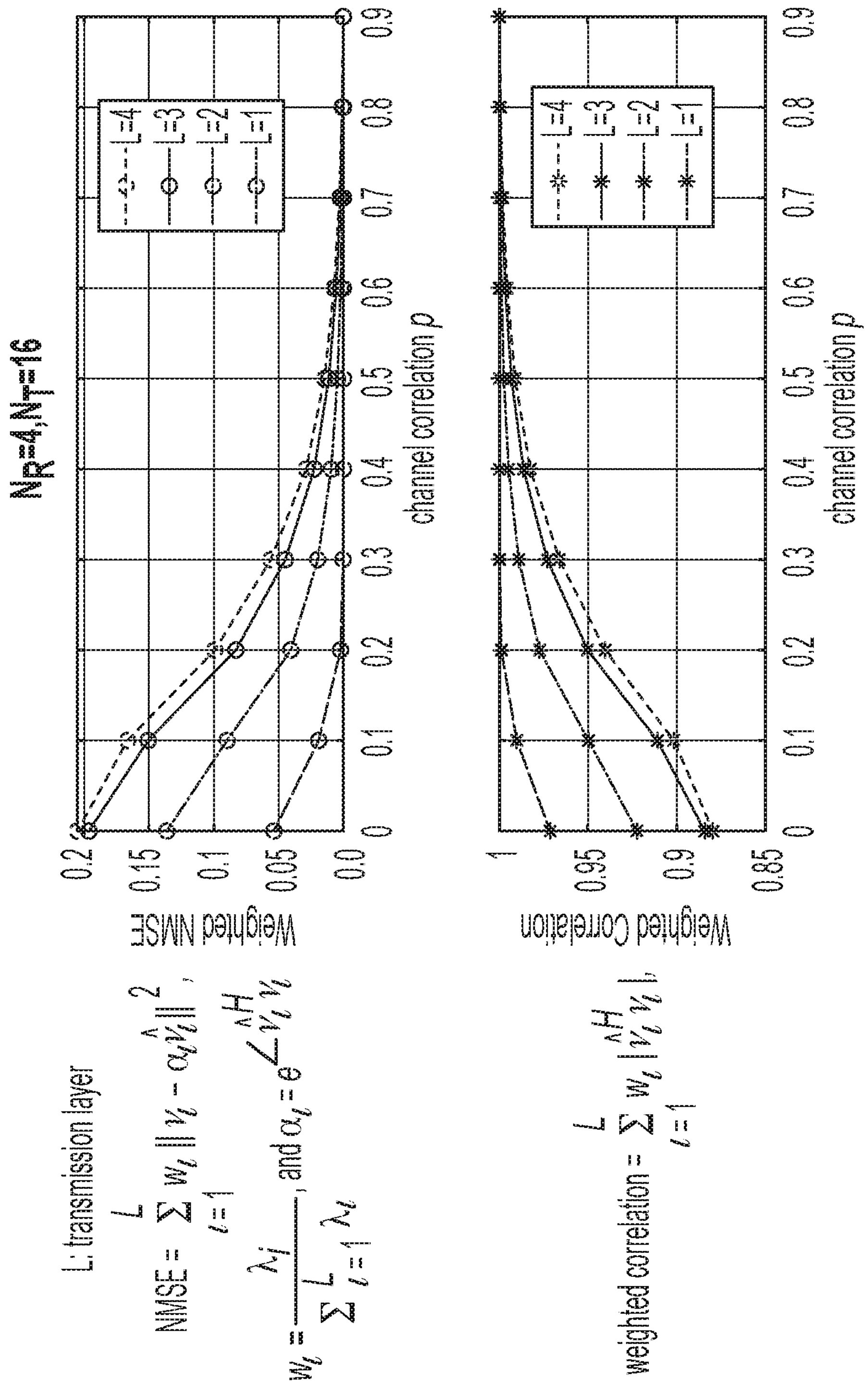
FIG. 4A is a graph of simulated performance, according to an embodiment of the present disclosure.
Figure 4B:
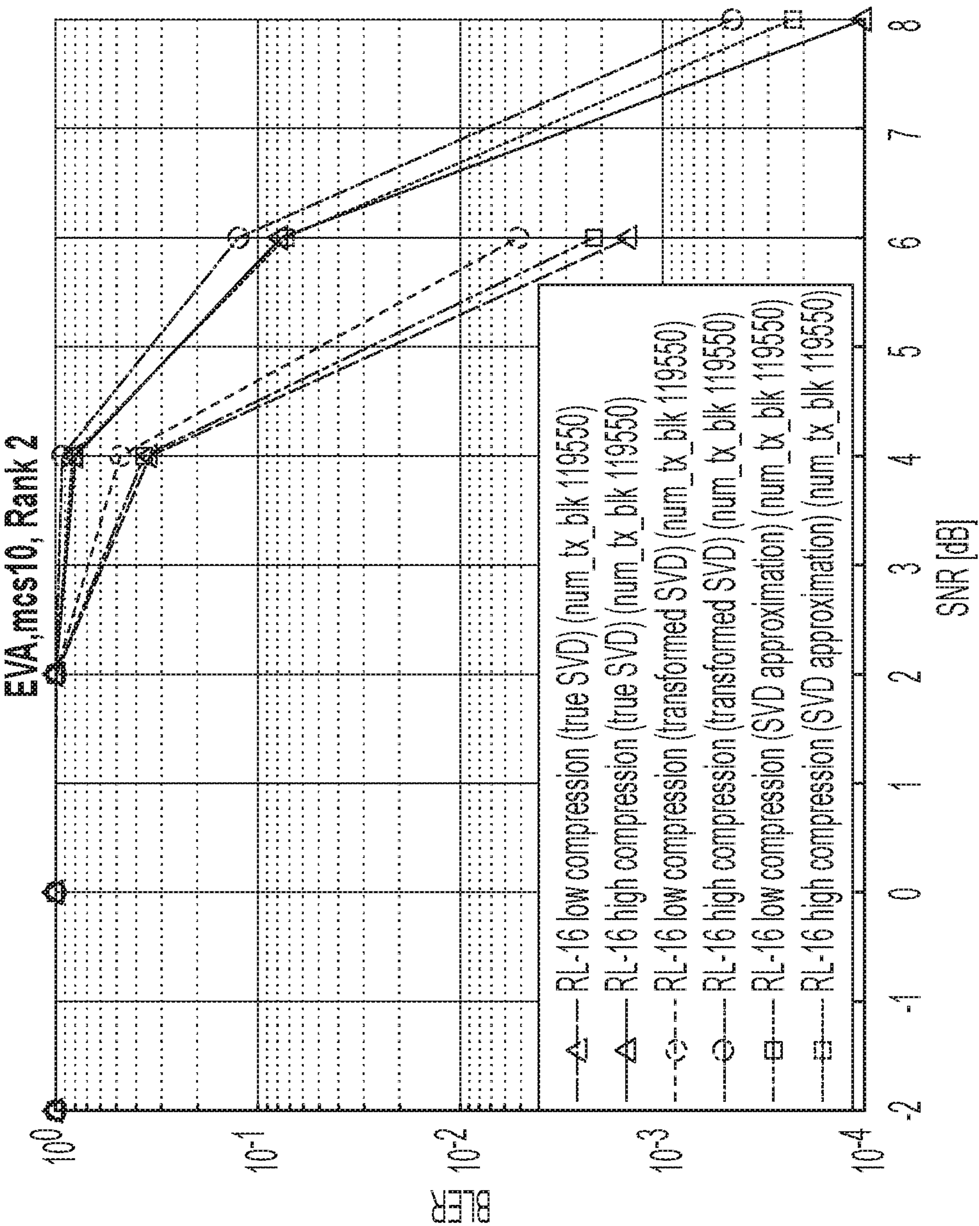
FIG. 4B is a graph of simulated performance, according to an embodiment of the present disclosure.
Figure 4C:
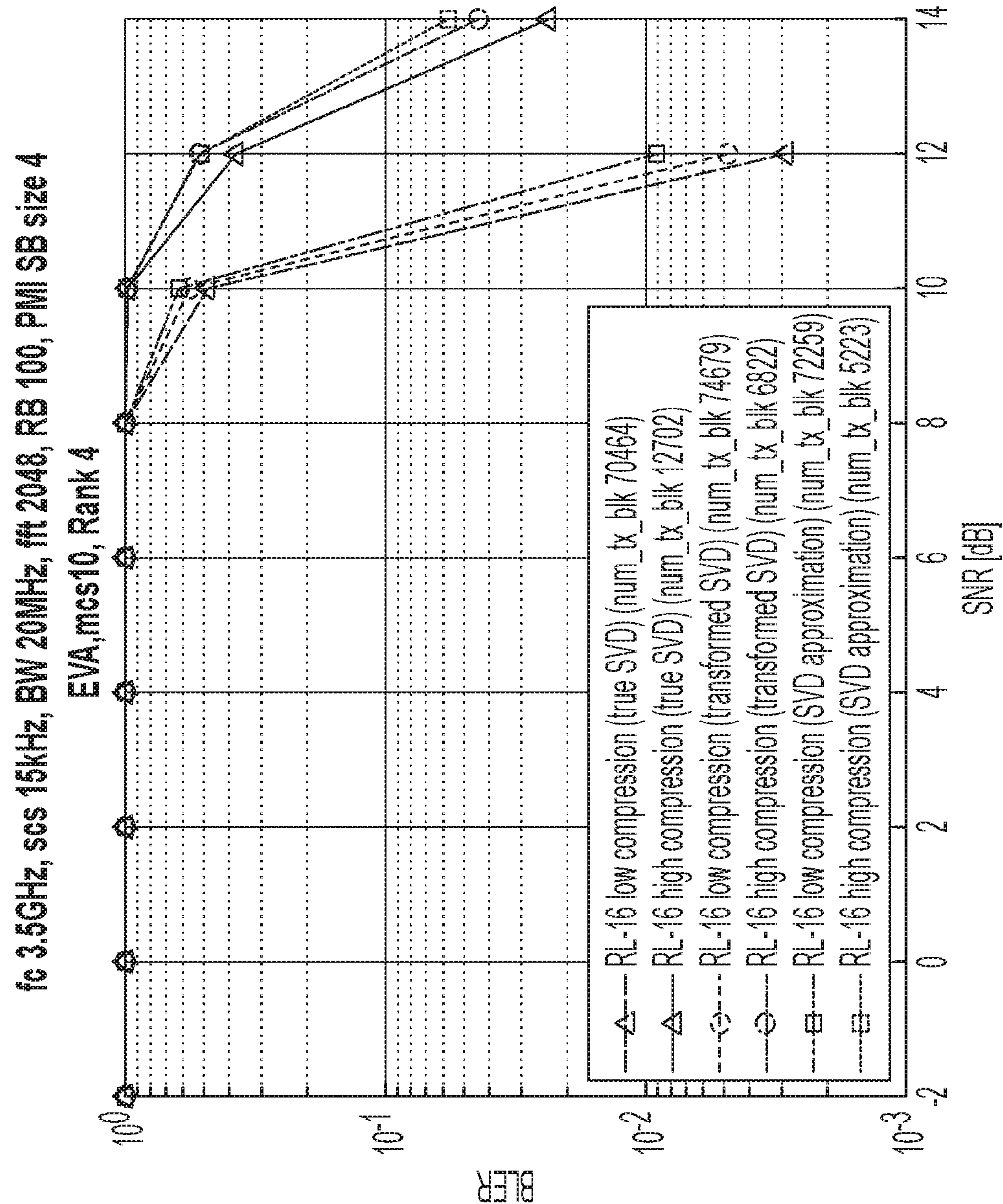
FIG. 4C is a graph of simulated performance, according to an embodiment of the present disclosure.

FIGS. 4A-4C shows simulated performance of the embodiment using an approximate singular value decomposition. FIG. 4A shows normalized mean squared error (NMSE) and correlation performance, with $$H_\rho=HC(\rho) \in \mathcal{C}^{N_R\times N_T}, H_{ij} \sim \mathcal{C}N(0,1), C(\rho)=\rho 1_{N_T}+(1-\rho)I_{N_T} \in \mathcal{C}^{N_T\times N_T}.$$

Each of FIGS. 4B and 4C is a graph of block error rate (BLER) as a function of signal to noise ratio (SNR).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and the term "rectangular" encompasses the adjective "square". As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, each of the terms "array" and "matrix" (a matrix being a two-dimensional array) refers to an ordered set of numbers regardless of how stored (e.g., whether stored in consecutive memory locations, or in a linked list). As used herein, "calculating a matrix" means to calculate the values of the elements of the matrix. As used herein, "calculating a singular value decomposition" means calculating a singular value matrix and at least one of a left singular vector matrix and a right singular vector matrix. When a first matrix includes, or "comprises" a second matrix, then the first matrix equals the second matrix, or the second matrix is a block of the first matrix.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of low-complexity methods of calculating a precoding matrix for use in MIMO transmission have been specifically described and illustrated herein, many modifications and variations will be apparent to those skilled in the art. Accordingly, it is to be understood that low-complexity methods of calculating a precoding matrix for use in MIMO transmission constructed according to principles of this disclosure may be embodied other than as specifically described herein. The invention is also defined in the following claims, and equivalents thereof.

What is claimed is:

1. A method, comprising:

calculating a first portion of a first singular value decomposition, based on a first portion of a channel matrix;

calculating a second portion of a second singular value decomposition, based on a second portion of the channel matrix;

calculating an intermediate matrix, based on:

the first portion of the first singular value decomposition and the second portion of the second singular value decomposition; and calculating a matrix of approximate right singular vectors, the calculating of the matrix of approximate right singular vectors comprising calculating a product of factors, the factors comprising a first factor based on the conjugate transpose of the intermediate matrix, a second factor based on a unitary matrix, and a third factor based on a diagonal matrix.

2. The method of claim 1, wherein the calculating of the intermediate matrix comprises calculating a row permutation of a matrix, the matrix comprising:

the first portion of the first singular value decomposition, and the second portion of the second singular value decomposition.

3. The method of claim 2, wherein:

the first portion of the first singular value decomposition comprises a first singular value matrix and a first right singular vector matrix;

the second portion of the first singular value decomposition comprises a second singular value matrix and a second right singular vector matrix;

the intermediate matrix comprises a first portion and a second portion;

the first portion of the intermediate matrix comprises:

a product of a first portion of the first singular value matrix and a first portion of the first right singular vector matrix, and a product of a first portion of the second singular value matrix and a first portion of the second right singular vector matrix; and the second portion of the intermediate matrix comprises:

a product of a second portion of the first singular value matrix and a second portion of the first right singular vector matrix, and a product of a second portion of second first singular value matrix and a second portion of the second right singular vector matrix.

4. The method of claim 3, further comprising:

calculating a first eigen decomposition, the first eigen decomposition being an eigen decomposition of the conjugate product of a first portion of the intermediate matrix; and calculating a second eigen decomposition, the second eigen decomposition being an eigen decomposition of the product of a second portion of the intermediate matrix and the conjugate transpose of the second portion of the intermediate matrix.

5. The method of claim 4, wherein the unitary matrix is based on:

a left eigenvector matrix of the first eigen decomposition, and a left eigenvector matrix of the second eigen decomposition.

6. The method of claim 4, wherein the diagonal matrix is based on:

eigenvalues of the first eigen decomposition, and eigenvalues of the second eigen decomposition.

7. The method of claim 1, further comprising multiplying a transmitted signal by a precoding matrix, wherein the precoding matrix comprises a right singular vector of the matrix of approximate right singular vectors.

8. A method, comprising:

calculating a first eigen decomposition, based on a first portion of a channel matrix;

calculating a second eigen decomposition, based on a second portion of the channel matrix;

calculating a transformation matrix, based on:

a left eigenvector matrix of the first eigen decomposition, a left eigenvector matrix of the second eigen decomposition, eigenvalues of the first eigen decomposition, and eigenvalues of the second eigen decomposition;

calculating an eigen decomposition of an intermediate matrix, the intermediate matrix being based on:

the transformation matrix, and the channel matrix; and calculating a right singular matrix of transformed channel, the calculating of the right singular matrix of transformed channel comprising calculating a product of factors, the factors comprising a first factor based on the conjugate transpose of the intermediate matrix, a second factor based on a unitary matrix, and a third factor based on a diagonal matrix.

9. The method of claim 8 wherein the calculating of the transformation matrix comprises calculating the product of a fourth factor and a fifth factor, wherein:

the fourth factor is a block diagonal matrix comprising:

the left eigenvector matrix of the first eigen decomposition, and the left eigenvector matrix of the second eigen decomposition; and the fifth factor is a first matrix, the first matrix being diagonal and comprising:

an eigenvalue matrix of the first eigen decomposition, and an eigenvalue matrix of the second eigen decomposition.

10. The method of claim 8, further comprising calculating the unitary matrix, the calculating of the unitary matrix comprising calculating a singular value decomposition of an off-diagonal block of the conjugate product of the intermediate matrix, to form a first left singular vector matrix and a singular value matrix.

11. The method of claim 10, further comprising calculating the unitary matrix, wherein a first block of the unitary matrix is the first left singular vector matrix; and a second block of the unitary matrix is the product of:

the conjugate transpose of the off-diagonal block of the conjugate product of the intermediate matrix, the first left singular vector matrix, and the inverse of the singular value matrix.

12. The method of claim 8, wherein:

the first factor is the conjugate transpose of the intermediate matrix, the second factor is the left eigenvector matrix of the eigen decomposition of the conjugate product of the intermediate matrix, and the diagonal matrix is the square root of an eigenvalue matrix of the eigen decomposition of the conjugate product of the intermediate matrix.

13. The method of claim 8, further comprising multiplying a transmitted signal by a precoding matrix, wherein the precoding matrix is the right singular matrix of transformed channel.

14. A system comprising:

a processing circuit;

a transmitter; and a plurality of antennas, the processing circuit being configured to:

calculate a first portion of a first singular value decomposition, based on a first portion of a channel matrix;

calculate a second portion of a second singular value decomposition, based on a second portion of the channel matrix;

calculate an intermediate matrix, based on:

the first portion of the first singular value decomposition and the second portion of the second singular value decomposition; and calculate a matrix of approximate right singular vectors, the calculating of the matrix of approximate right singular vectors comprising calculating a product of factors, the factors comprising first factor based on the conjugate transpose of the intermediate matrix, a second factor based on a unitary matrix, and a third factor based on a diagonal matrix.

15. The system of claim 14, wherein the calculating of the intermediate matrix comprises calculating a row permutation of a matrix, the matrix comprising:

the first portion of the first singular value decomposition, and the second portion of the second singular value decomposition.

16. The system of claim 15, wherein:

the first portion of the first singular value decomposition comprises a first singular value matrix and a first right singular vector matrix;

the second portion of the first singular value decomposition comprises a second singular value matrix and a second right singular vector matrix;

the intermediate matrix comprises a first portion and a second portion;

the first portion of the intermediate matrix comprises:

a product of a first portion of the first singular value matrix and a first portion of the first right singular vector matrix, and a product of a first portion of the second singular value matrix and a first portion of the second right singular vector matrix; and the second portion of the intermediate matrix comprises:

a product of a second portion of the first singular value matrix and a second portion of the first right singular vector matrix, and a product of a second portion of second first singular value matrix and a second portion of the second right singular vector matrix.

17. The system of claim 14, wherein the processing circuit is further configured to:

calculate a first eigen decomposition, the first eigen decomposition being an eigen decomposition of the conjugate product of a first portion of the intermediate matrix; and calculate a second eigen decomposition, the second eigen decomposition being an eigen decomposition of the product of a second portion of the intermediate matrix and the conjugate transpose of the second portion of the intermediate matrix.

18. The system of claim 17, wherein the unitary matrix is based on:

a left eigenvector matrix of the first eigen decomposition, and a left eigenvector matrix of the second eigen decomposition.

19. The system of claim 17, wherein the diagonal matrix is based on:

eigenvalues of the first eigen decomposition, and eigenvalues of the second eigen decomposition.

20. The system of claim 14, wherein the processing circuit is further configured to multiply a transmitted signal by a precoding matrix, wherein the precoding matrix comprises a right singular vector of the matrix of approximate right singular vectors.

* * * * *